United States Patent
Tethal et al.

(10) Patent No.: US 9,855,685 B2
(45) Date of Patent: Jan. 2, 2018

(54) METHOD OF MAKING A PRODUCT WITH A FUNCTIONAL RELIEF SURFACE WITH HIGH RESOLUTION

(75) Inventors: Tomas Tethal, Husinec-Rez (CZ); Michaela Steinerova, Praha (CZ)

(73) Assignee: IQ Structures, S.R.O. (CZ)

( * ) Notice: Subject to any disclaimer, the term of this patent is extended or adjusted under 35 U.S.C. 154(b) by 765 days.

(21) Appl. No.: 14/343,329

(22) PCT Filed: Aug. 29, 2012

(86) PCT No.: PCT/CZ2012/000088
§ 371 (c)(1),
(2), (4) Date: Jun. 4, 2014

(87) PCT Pub. No.: WO2013/034117
PCT Pub. Date: Mar. 14, 2013

(65) Prior Publication Data
US 2014/0367881 A1     Dec. 18, 2014

(30) Foreign Application Priority Data
Sep. 6, 2011   (CZ) ..................................... 2011-555

(51) Int. Cl.
*B29C 39/16*   (2006.01)
*B29C 33/38*   (2006.01)
(Continued)

(52) U.S. Cl.
CPC .......... *B29C 39/16* (2013.01); *B29C 33/3857* (2013.01); *C04B 28/006* (2013.01);
(Continued)

(58) Field of Classification Search
CPC ............... B29C 39/16; B29C 33/3857; B29C 2043/025; B29C 2043/026; B42D 25/328; C04B 28/006
See application file for complete search history.

(56) References Cited

U.S. PATENT DOCUMENTS 3,661,081 A * 5/1972 Wright ..................... B41F 5/24
                                                    101/219
3,987,728 A * 10/1976 Miller ..................... B41C 1/055
                                                    101/401.1
(Continued)

FOREIGN PATENT DOCUMENTS

CZ   WO2013/034117         3/2013
WO        WO9321126 A1  * 10/1993

OTHER PUBLICATIONS

Buckley et al, Sol-Gel Preparation of Silica Gels, Journal of Chemical Education, 1994, pp. 599-602.*
(Continued)

*Primary Examiner* — Alison L Hindenlang
*Assistant Examiner* — Emmanuel S Luk
(74) *Attorney, Agent, or Firm* — Taylor Russell & Russell, P.C.

(57) ABSTRACT

A method of making products with a functional relief surface (2) with high resolution up to 10 nm, which is copied from a template (1) or carrier of the negative relief of the surface, the so-called master. The template (1) of the relief surface (2) is provided with at least one layer of geopolymer composite, applied in a precursor state (3), in form of a liquid dispersion or grout in plastic or thixotropic condition, whose thickness is the same or greater than the depth of the template relief (1), at temperatures in the interval from the temperature corresponding to properties of the precursor (3) to the temperature corresponding to thermal decomposition of the precursor (3), and after hardening of geopolymer composite the layer or layers is/are separated from the template (1).

13 Claims, 2 Drawing Sheets

(51) Int. Cl.
*C04B 28/00* (2006.01)
*B29C 43/02* (2006.01)
*C04B 111/00* (2006.01)
*B42D 25/328* (2014.01)
*B29K 105/00* (2006.01)
*B29K 105/16* (2006.01)
*B29K 309/00* (2006.01)

(52) U.S. Cl.
CPC .. *B29C 2043/025* (2013.01); *B29C 2043/026* (2013.01); *B29K 2105/0005* (2013.01); *B29K 2105/16* (2013.01); *B29K 2309/00* (2013.01); *B42D 25/328* (2014.10); *C04B 2111/00482* (2013.01); *Y02P 40/165* (2015.11)

(56) References Cited

U.S. PATENT DOCUMENTS

| | | | | |
|---|---|---|---|---|
| 5,310,222 A * | 5/1994 | Chatwin | | G03H 1/02 283/109 |
| 2002/0115002 A1* | 8/2002 | Bailey | | B29C 35/0888 430/5 |
| 2005/0051698 A1* | 3/2005 | Sreenivasan | | B29C 43/003 249/135 |
| 2007/0221100 A1* | 9/2007 | Kumar | | C04B 28/006 106/707 |
| 2007/0261016 A1* | 11/2007 | Sandhu | | B82Y 10/00 716/50 |
| 2008/0083484 A1* | 4/2008 | Blanchet | | B82Y 10/00 156/234 |
| 2009/0239971 A1* | 9/2009 | Moszner | | A61K 6/0073 523/118 |
| 2011/0027407 A1* | 2/2011 | Lee | | B82Y 10/00 425/470 |
| 2011/0259223 A1* | 10/2011 | Cau | | B82Y 10/00 101/453 |
| 2013/0059089 A1* | 3/2013 | Gullentops | | B41C 1/182 427/510 |

OTHER PUBLICATIONS

Duxson et al, Geopolymer Technology: The Current State of the Art, Dec. 19, 2006, Journal of Material Science, (2007), vol. 42, pp. 2917-2933.*

* cited by examiner

METHOD OF MAKING A PRODUCT WITH A FUNCTIONAL RELIEF SURFACE WITH HIGH RESOLUTION

TECHNICAL FIELD

The invention relates to a method of making products from geopolymer composite with a functional relief surface with high resolution. The functional micro (nano) relief surface is a surface whose mechanical, chemical, optical, adsorption, absorption, adhesive, aerodynamic, electric, hydrodynamic and other properties are different from the identical material without the relief and such new properties or property can be practically used.

BACKGROUND ART

Currently, conventional printing or large-volume copying of reliefs with functional surfaces, e.g. optical reliefs with diffractive surface, refractive surface, with refraction or data, use templates (masters) that modify the incident light wave. The masters are nearly exclusively made of metal, nickel, chromium, steel, copper etc. and if the printing resolution is relatively low (with the smallest detail size 10 to 20 μm) then they can be made of plastic. Masters for copying of optical structures with very fine reliefs are made by galvanization as a foil (metal sheet). The metal sheet is grown on a cathode that is used as a template for the master. The method is disadvantageous due to the size limitations of galvanic baths. In case of rotation copying a metal sheet or foil is stretched on a cylinder but this results in visible joints (links) when individual parts are connected. When printing colors on paper or plastic the motif is developed on cylinders (photogravure) or using a technique similar to multiplication of optical structures, e.g. flexoprint for low resolutions or intaglio (printing block—metal sheet made by galvanoplasty, stretched on cylinders) or offset printing. One disadvantage is that it is very difficult to achieve a higher resolution, below the size of the smallest detail 10 μm.

Paper, plastic and printing inks are complemented with security elements. The elements are supposed to aggravate potential forgery and they are also used for fast or official verification of authenticity. They are mainly special pigments that change color depending on the observation angle (optically variable inks), fibers or particles with color effects in visible or ultraviolet light, pigments, fibers or particles that change infrared light to visible light (the so-called anti-stokes pigments), microparticles that can be oriented in magnetic field, active in infrared light etc. A recent method that is still under development involves use of identification microparticles that bear specific information on the surface connected with the user (e.g. logo), production time, application etc.

The information on the surface of such objects is applied by sophisticated technologies, mostly in form of graphic diffractive or non-diffractive recordings (e.g. JDSU, Optaglio). The demanding manufacturing process also influences the price. Another limitation consists in the fact that security microparticles with information on the surface, due to the materials used up to now, i.e. particularly metals and plastics, are difficult to combine with other materials with other effects that can be achieved by addition of the above-mentioned optically active substances which are common on the markets and to which the users are accustomed to.

DISCLOSURE OF INVENTION

The invention concerns the method of manufacture of products with a functional relief surface with high resolution up to 10 nm (i.e. the size of a detail that can be resolved is 10 nm and more), which is copied from a template or a carrier of a negative relief of the surface, the so-called master. The principle of the invention consists in the fact that the template of the relief surface is provided with at least one layer of geopolymer composite, applied in a precursor state as a liquid dispersion to grout in plastic or thixotropic condition, with the same or greater depth then the depth of the relief, at temperatures from the temperature corresponding to cryoscopic properties of the precursor to the temperature corresponding to thermal decomposition of the precursor, and after the hardening of geopolymer composite the layer is separated from the template.

The application of the layer of geopolymer composite in a precursor state is performed by casting, dip coating, spin coating and spraying or rolling of a layer of non-sagging grout, while minimizing formation of air bubbles. During the application the precursor shall fill in all the space defined by the relief so that no bubbles are present between the precursor and the template.

Alternatively, during its formation the layer of geopolymer composite may be exposed to vibrations, pressure or vacuum to achieve proper contact with the template surface.

Geopolymer composite is usually formed at working temperatures from 5 to 50° C., preferably at temperatures of the surrounding environment from 20 to 25° C. The lower limit is defined by cryoscopic properties of the dispersion, i.e. by a temperature, at which the dispersion freezes into a solid. The upper limit is defined by technical parameters of the template, i.e. by the temperature at which the template material sensitively reacts by changing its properties (naturally also by the temperature of precursor thermal decomposition, depending on which of them is lower). Precursor may be applied in several stages while special attention is paid to adhesion of the precursor and the subsequent layers are only carrying and reinforcing. Their compositions may be different.

Precursor of the geopolymer composite is a mixture of filler and binder, where the binder is a reactive substance, alkaline-activated aluminosilicate, which is capable of polymerization. The material is of mineral origin and for this reason it is called geopolymer. Its polymerization produces an amorphous matrix as a result of sol-gel dispersion of the initial agents in alkaline water solution. The reaction is characterized by formation of siloxane bonds Si—O—T (where T=Si or Al in a variable ratio Si:Al), while bridge atoms of oxygen in the initial aluminosilicates are transformed into non-bridge atoms as a result of decomposition and then back to bridge atoms during polycondensation to produce a solid substance. The conversion may occur both in the air at a normal temperature and pressure and under other conditions (below the freezing point or under higher temperatures up to 300° C. and under any pressure without access of air). The initial raw materials are metakaolinite, fly ashes and slags.

The dynamic viscosity of the initial dispersion or grout during formation of a layer or layers of geopolymer composite by casting ranges from 1000 to 50000 mPas. The minimum value may be lower and it is limited by sedimentation of the dispersion. The maximum value may be higher and it is limited by a condition when the grout is still able to flow depending on the operating strain. The grout may be also non-sagging. In a plastic condition the layer is created from the grout otherwise than by casting e.g. by extruding, spreading or rolling.

One advantage is the very good ability of the geopolymer composite precursor (for simplicity reasons only the term geopolymer is used in literature) to copy surfaces with microrelief with the minimum dimension of detail 10 nm. As the geopolymer composite dispersion is transformed by a chemical reaction of its micro- and nano-particles from liquid to solid state it does not contain big grains of the initial precursor and this enables to copy the relief with high resolution. Another significant advantage is the fact that there is no limitation to the size of the composite area. Therefore products carrying a functional relief on the surface can be in orders of magnitude from 1 μm to several meters. Another advantage is the dimensional stability as the products do not change their dimensions when transformed into solid state. Other advantages, in comparison to all-metal products (masters), include the negligible price of the material and saving of valuable metal raw materials and energy for their processing. The speed of application of the easy geopolymer technology enables fast replacement of masters and thus also their variability.

To increase product strength while keeping the fine structure of the surface, the product can be made of structurally different layers visible on a section perpendicular to the surface relief, both by using a filler with anisotropic particle substances with grains of various shapes and sizes and by isotropic fillers and macromolecular substances, such as whiskers and isotropic macromolecules (e.g. mica, carbon nano-tubes, plant cellular structures) or by reinforcement with fibers and textiles made of mineral and glass melts, carbon, plastics, cellulose and metal wires. A functional part of the geopolymer composite layer, adjoining on the surface relief, contains grains that are smaller or the same size as the minimum dimension of the relief, while the other layers on the product may contain greater particles of solid matters. Reinforcement of the relief surface as such is alternatively achieved by deposition of additional substances (e.g. metals, metal nitrides and functional compounds) or by penetration with reinforcing solutions (e.g. organosilicates, macromolecular solutions).

After removing the entire composite from the template the product is maintained at a constant humidity, e.g. in air-conditioned premises or wrapped in a foil for a period from several hours to days in order to prevent evaporation of water necessary for stabilization of the product's microstructure and to prevent potential formation of microcracks. Alternatively, the surface may be provided with a bonding primer.

The binding geopolymer material contains on average $SiO_2$ usually from 20 to 95% wt., $Al_2O_3$ from 5 to 89% wt. and other substances recalculated to oxides, such as $Fe_2O_3$ from 0 to 79% wt., CaO from 0 to 79% wt., $Na_2O$ from 0 to 35% wt. and $K_2O$ from 0 to 35% wt., $Li_2O$ from 0 to 35% wt., $TiO_2$ from 0 to 79% wt. Alternatively, the binding geopolymer material contains on average $SiO_2$ from 46 to 80% wt., $Al_2O_3$ from 5 to 40% wt., $Fe_2O_3$ from 2 to 70% wt., CaO from 0 to 50% wt., $Na_2O$ from 0 to 35% wt. and $K_2O$ from 0 to 35% wt., while for specific surfaces of the filler and other added solid substances greater than $6 \times 10^{-2}$ m$^2$/g the minimum content of the geopolymer binder is 10% wt. if no other binders are used.

Alternatively, the aluminosilicate binder may be complemented with other binders from the group of Portland cement, phosphates, resins of natural and artificial origin and organic macromolecules of their monomers. Alternatively, additional additives may be used as minority components, selected from a group of metals, as well as B, C, in units up to 30% wt. Other components (accounting for 0 to 5% wt.) include alternatively other elements of the periodic system, such as contaminants, salt anions (halogens) and introduced markers and elements in quantities defined by formation of a required functional effect.

The filler contains inorganic solid substances selected from a group of oxides, minerals, metals and glass and/or organic substances, including pulverized plastics, and provided the specific surface of the filler and insoluble additives is greater than $6 \cdot 10^{-2}$ m$^2$/g then the minimum content of the binder is 10% wt. Fillers with a lower specific surface may account for up to 98% wt. of the composite.

The term functional relief declares the fact that the presence of the relief provides the surface with properties the surface would not otherwise have without the relief. A unique shape and dimensional parameters of the relief purposefully predefine the properties, particularly without addition of other chemical substances, e.g. in the case that a certain wave length is reflected, absorbed or refracted, which corresponds to certain dimensional parameters of the relief. Other functions of the functional relief are described below.

Functional relief surface is a surface from a group including optically active relief surfaces, mechanical, hydromechanical, aerodynamic, adsorption or selective functional surfaces or data relief surfaces. Functional optically active relief surface is a surface from a group including optical diffractive relief surfaces, reflexive relief surfaces, refractive relief surfaces, electronic functional surfaces and data carrying surfaces.

The templates as such are prepared based on a proposed or calculated design by laser engraving, lithographic technology in metals and plastic, electroerosion (in metals and carbon), stereolitography from plastics and galvanically from metal solutions.

The product may be one of many options, e.g. security microelement, which looks on the outside as an artificial microparticle provided with a data structure relief, where the geopolymer material is complemented with substances active in ultraviolet and/or infrared light or colored with a visible color at least in a part of the volume, e.g. in the microrelief surface. Thanks to those features the security level of optically active ingredients may be linked to additional information on the surface of those particles. An advantage of the use of pigments active in ultraviolet part of the spectrum is their available identification, usually used in practice for detection of a hidden security element that is not visible with the naked eye under normal conditions.

Anti-stokes pigments are active in infrared spectrum, changing infrared light to visible light, may be added into geopolymer composite. Normally the pigment is not visible with the naked eye and for protection against forgery, e.g. similarly as in the previous case with geopolymer microelements, it can be observed in laser illumination with wavelength in the infrared area. This means that the base containing active microparticles in a location (point) illuminated with infrared laser will be highlighted with a visible color. The visible color scale is similar to that of UV pigments (orange, red, blue, green, yellow). This method of detection is not planar (only the impact point of the laser beam is observed) and therefore it is not that much widespread as UV lamps, where e.g. the entire passport page or banknote etc. can be observed at a time. However, the materials are less available to common forgers than UV pigments.

Another application is a product from the group geopolymer microparticles for protection against forgery which uses compounds emitting a unique spectrum when illuminated with infrared light. The resulting spectrum is unique for each particular pigment. However, the detection cannot be performed with the naked eye and analyzers are used that provide an optical or acoustic signal confirming that the pigment is genuine.

Common pigments that are active in visible light and that can be used to color geopolymers to achieve particular security, aesthetic or other functional properties, may be combined with those that transform ultraviolet light, normally present in daylight, into visible light. Consequently, the brightness of the observed colors increases. They are the so-called fluorescent colors.

BRIEF DESCRIPTION OF DRAWINGS

The attached drawings show examples of execution of the invention hereunder.

DESCRIPTION OF PREFERRED EMBODIMENTS

Geopolymer composite (i.e. a material from the glass and ceramics group or materials, whose properties and look are similar to microporous ceramics) with a functional surface may serve as a final product shaped in space and plane. In other cases the geopolymer product provided with functional relief may be the template 1 and the master for further copying. A geopolymer master may be both planar (for copying in the plane) and cylindrical (for rotating copying) or otherwise spatially shaped. Copying can be performed with several methods:

Planar Copying or Copying from Plane

Figure 1:
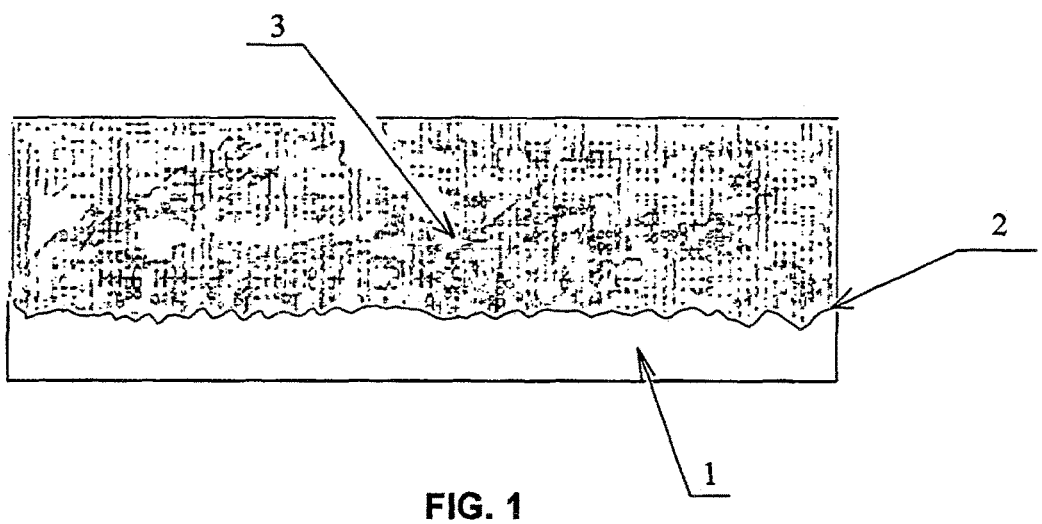
FIG. 1 schematically shows copying of a template of functional relief surface and formation of a master from geopolymer composite.
Figure 2:
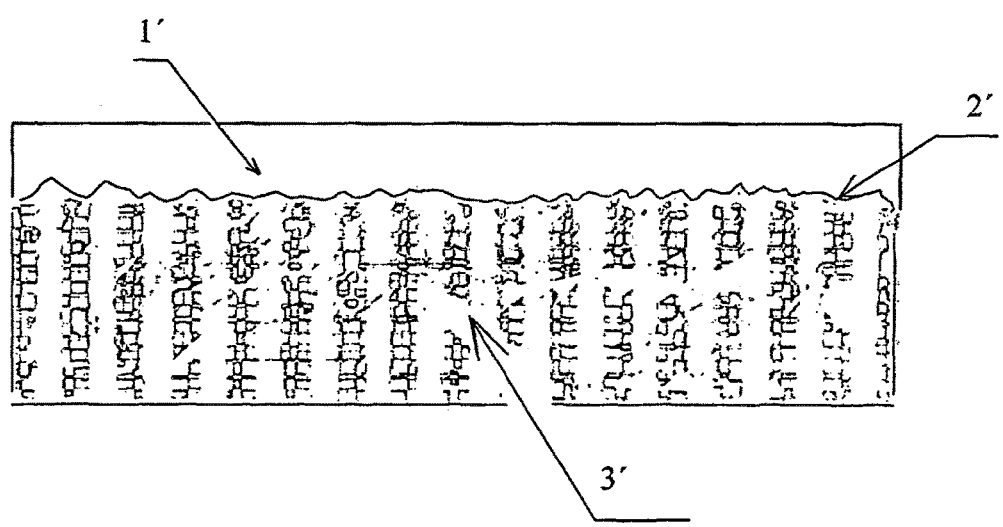
FIG. 2 shows the principle of relief copying in presses for injection molding, extrusion and vacuum forming, or simple coating with plastic made of polymer suspension, by evaporating the solvent in which the polymer is dissolved or block polymerization on a master, where the geopolymer master with a functional relief is in place as a part of the mold.

The first possibility to copy the relief from the geopolymer master is a copy into a dissolved, melted or polymerizing plastic or other material. A layer of moldable plastic is applied on a geopolymer master (separated and non-separated) and then left to solidify (by cooling, evaporation of solvent, change of solubility, polymerization etc.)—see FIG. 2. After the solidification the resulting copy is separated from the geopolymer master. An example of coating with a layer from a plastic solution can be application of polycarbonate dissolved in methyl chloride. Another example of coating is formation of a layer on a geopolymer master by evaporation of polymer suspension, followed by application of polymerizing liquid methyl metacrylate which gradually hardens to form polymethyl metacrylate. Yet another possibility is copying by pressing in injection molding presses for plastics or vacuum forming where geopolymer master with a functional relief is a part of the mold.

Rotagravure

Figure 3:
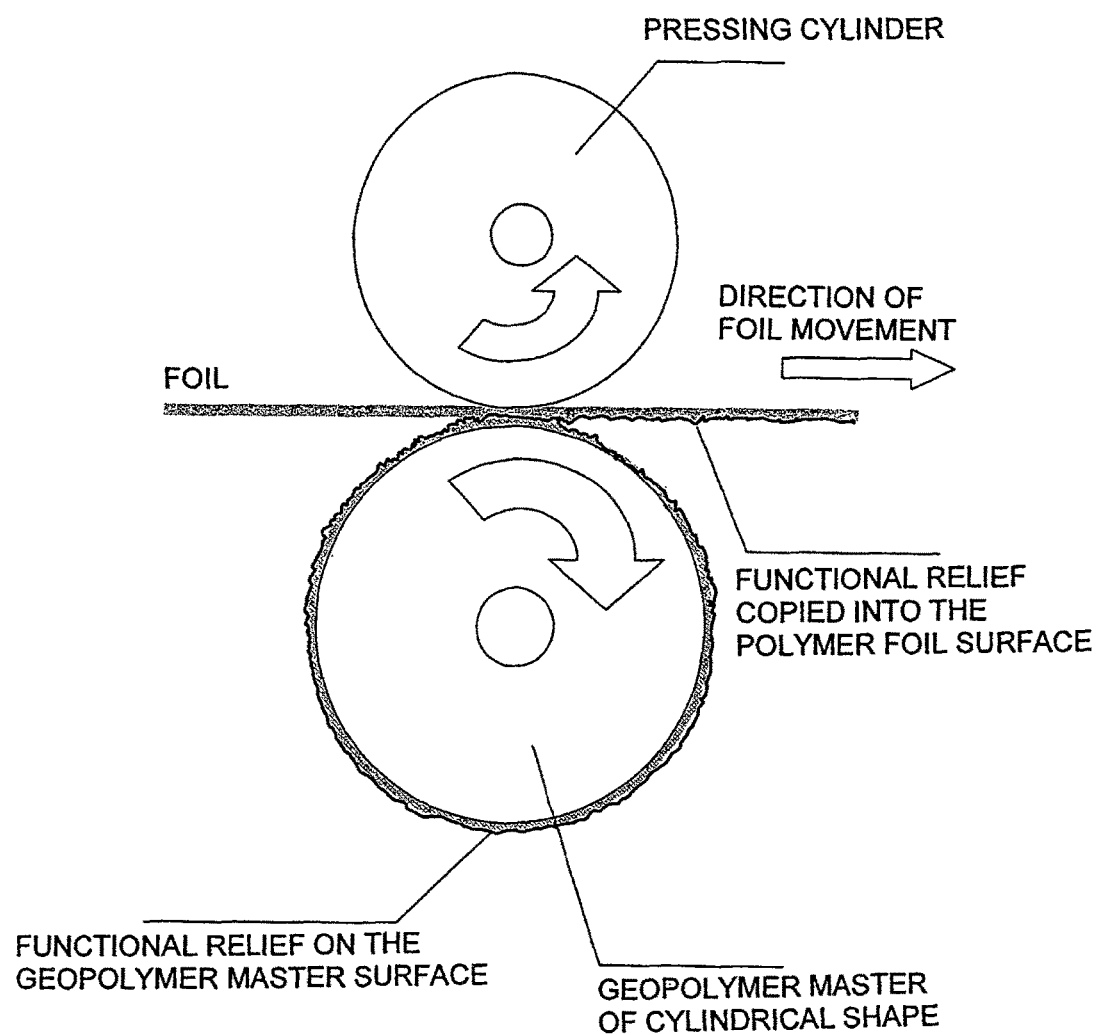
FIG. 3 shows a cylinder-shape geopolymer master with a functional relief on the surface. The relief is copied by pressure at the temperature of plastic softening into the surface of plastic foils by means of rotation against the press cylinder.

In this case the geopolymer master is a cylinder with a functional relief on the surface. The relief is copied at the temperature of the plastic softening into a surface of plastic foils (e.g. polyethylene terephtalate—PET, polyvinyl chloride—PVC, polypropylene—PP, polycarbonate—PC), or e.g. aluminum foils, by rotation against the press cylinder—see FIG. 3.

Manufacture of Other Templates and Masters for Copying of Surface Reliefs

Reliefs Representing Information

One example may be a geopolymer microdot made of geopolymer composite, provided with a relief carrying information. Another product with relief information may be e.g. a geopolymer plate with a copied relief which is used for data storage. The data may be read either with the naked eye or, if very small, with a magnifying glass, optical microscope or electron microscope. The data may be also legible with fingers (e.g. Braille) or with mechanical or laser sensors. The information may be a graphic relief—both bitmap or vector, or entries consisting of a set of letters, figures or other alphanumeric characters; the relief may consist of signs or Braille characters etc. Geopolymer with a relief may be both the product and the template 1 for copying into other materials, plastics and metals, as well as geopolymer.

Relief with Special Mechanical Properties

A microrelief consisting of a very fine structure, whose individual elements alone in the macroscale are not functional, may have practically usable properties as a whole made up of a big number of such structures. One example is a relief which provides the surface with adhesive properties, although it is not covered with any glue. One such demonstration can be found in nature (the relief on gecko fingertips makes it possible for the animal to adhere even on a vertical surface). The basis of adhesion may be also microrelief with a function similar to a zipper. An opposite example may be a microrelief which generally reduced rolling and translation friction. The example is a microrelief with such a shape of relief structures that ensure sliding in only one selected direction. It may be used e.g. on running surfaces of skis etc. Another example are rough (anti-slip) geopolymer surfaces used on floor tiles, slant surfaces of structures, machines etc. Geopolymer with a relief can be both the product and the template 1 for copying into other materials, particularly plastics.

Geopolymer with a Microrelief Increasing the Size of its Surface

An example may be a product made of geopolymer composite with the surface enlarged with a microrelief and covered with catalytic material to operates e.g. as a catalyst for treatment of gaseous mixtures (e.g. in car exhaust fumes—another advantage here is the chemical and particularly thermal resistance of geopolymer materials). Another use of such catalysts may be in chemical industry, such as crude oil cracking, reaction columns etc., where the microrelief increases the size of the contact area for the reagents.

Geopolymer with an Increased Surface Covered with Chemicals which is a Part of a Galvanic Cell The advantage in this case consists in the high specific surface in combination with chemical and thermal resistance.

Geopolymer with a Surface Increased by a Relief

The geopolymer surface is provided with a functional adsorption group. For adsorption or chemisorption the sorption capacity per unit of sorbent weight increases with the growing specific surface. Sorbents with rastered surface may be used in air filters, ion exchanger carriers e.g. for water softening, for sorption of radioactive and other substances, such as dust particles, in chemical industry, wastewater treatment etc.

Geopolymers with Special Hydrodynamic and Aerodynamic Properties

Microreliefs consisting of a very fine structure, whose individual elements alone in the macroscale are not functional, may have convenient and practically usable properties as a whole made up of a big number of such structures, in respect to the streamline motion of liquids and gases. They may be used for products whose microsurface relief enables better flow in one direction in comparison with other directions (e.g. reliefs that are in terms of shape and arrangement similar to fish scale or bird feathers). Such surfaces may be used on bodyworks of ships, aircrafts, trains, rockets or cars. Geopolymer with a relief may be both the product and the template 1 for copying into other materials, particularly plastics and metals. Geopolymer composite may form large-area masters in the shape of the individual parts of the jacket or the entire hull, fuselage or bodywork.

Microrelief Surfaces with Topographically different Properties

If a material bears a microrelief on its surface it may have different properties depending on its shape, e.g. in macroscale it may be hydrophobic or hydrophilic. The same situation occurs when a part of the surface is provided with a microrelief and another part is not. Such a surface may serve as e.g. printing cylinder that receives ink only on a part of its surface. Another example of topologically arranged microrelief elements are transport microchannels for micromanipulation with samples of liquids, tissue cells, for selective adsorption etc. The product in this case is a carrying substrate for scientific research, a functional layer for plastic cards provided with Lab on chip technology e.g. for detection of user's health condition etc. Geopolymer with a functional relief may be both the product and the template 1 for copying into other materials, particularly plastics and metals, as well as geopolymer.

Microrelief Surfaces Electrically Conductive

Electric conductivity associated with the relief structure may be used e.g. for adsorption or polarization of light, microwave or radio signals etc. An example of the use of such a surface may be the bodywork of military transport vehicles that prevent radar detection. A microrelief surface prevents reflection of radiation or disperses the radiation to significantly aggravate the detection.

Geopolymer Composite may be also Used as a Printing Cylinder or Printing plate

Examples of Products

1) An example of the product may be microdot, a product made of geopolymer composite with a microscopic relief on the surface with the smallest detail size 100 nm and the product size 200×200×50 µm.

Average composition: $SiO_2$ 45% wt., $Al_2O_3$ 15% wt., $Fe_2O_3$ 25% wt., $Na_2O$ 7% wt., $K_2O$ 8% wt.

2) Registration card—a fireproof product made of geopolymer composite with an microscopic relief on the surface with the smallest detail size 100 nm and the product size 40×30×0.8 mm.

Composition of the binder matrix: $SiO_2$ 57% wt., $Al_2O_3$ 23% wt., $K_2O$ 5% wt., $Na_2O$ 3% wt., $Fe_2O_3$ 4% wt., MgO 2% wt., C 3% wt., armed with carbon fibers.

3) Master with a negative microrelief template, the product made of geopolymer composite resistant to cracking, with the smallest detail size 100 nm and the product size 400×600×25 mm.

Composition of the binder matrix: $SiO_2$ 30% wt., $Al_2O_3$ 14% wt., $Na_2O$ 22% wt., $Fe_2O_3$ 20% wt., CaO 8% wt., $P_2O_5$ 6% wt., filler of subsurface layers $SiO_2$ 60% wt., PMMA 10% wt.

4) Reaction column packing—a product made of geopolymer composite in the shape of rings with an active relief surface, sized 15×3 mm, inside diameter d=5 mm.

Average composition of the binder: $SiO_2$ 25% wt., $Al_2O_3$ 10% wt., $Na_2O$ 5% wt., $K_2O$ 15% wt., $TiO_2$ 26% wt., ZnO 9% wt. $B_2O_3$ 8% wt., $Au_2O_3$ 1% wt., $SO_2$ 1 wt., filler of subsurface layers $Al_2O_3$ 30% wt.

5) Substrate for sensors with active surfaces—a product made of geopolymer composite in the shape of a plate 10×10×1 mm.

INDUSTRIAL APPLICABILITY

Geopolymer products with optically active relief surfaces with high resolution up to 10 nm may be e.g. in the form of security microelements protecting against forgery, e.g. microdots etc., provided with additional information on the surface. The geopolymer composite material may be complemented with additives, e.g. substances active in ultraviolet and infrared light; geopolymer may be also colored with a visible color. This enables a combination of the security feature of optically active admixtures with additional information on the surface.

The range of products made of geopolymers with functional surfaces is potentially very broad.

Generally, they may be divided into products and templates, i.e. molds for further copying (geopolymer masters). Examples of products are surface boards with reliefs and optical properties (the absorption of light and other electromagnetic radiation, light reflection, polarization, color effects etc.) or mechanical or hydromechanical properties (hydrophobization of the surface, streamline motion, selective adsorption of organic, inorganic and live organisms etc). The relief structure may significantly increase both the specific surface of the product and the size of product surface, reactivity of adsorbed or otherwise deposited substances, it may serve as a filtration element etc. In practice they may be used in parts of solar collectors, façade lining and functional interiors (e.g. disinfecting in connection with TiO2) and designed surface finish of products. Further, they may be used in linings that improve streamline motion around the product (air, water), for improvement of surface properties of reservoirs, piping, turbines, ship hulls, car bodywork, aircraft fuselage, parts of sorption equipment, filters (chemical and mechanical), sanitary technology, chemical reactors, refrigerating equipment (by increasing the surface area), carriers for catalysts and chemical agents, chemical batteries, hydrogen sorbents in fuel elements. They may also serve as anti-slip and abrasive materials or parts of machines or, in the case of geopolymer composites with conductive fillers, also as parts of radars or anti-radar surfaces etc.

Geopolymer masters may be used for planographic printing or for or rotogravure. It is also possible to consider geopolymer cylinders or printing plates for high resolution printing. Classical printing methods focus on the smallest printing point sizes at the limit (or below the limit) of discrimination with naked eye. In general, the best quality printing techniques are capable of printing a point from ca. 30 micrometers. For the classical polygraphy market those technologies are sufficient. One obvious application for higher resolution can be in printing of valuables (protection of governmental interests and protection of owners of established brands), not only in quality printing for inspection purposes but also for a combination of printing with optical filters (moiré, polarization filters etc.), as well as for a combination with optics on a foil (refractive, e.g. lenticular films with high resolution or diffractive, e.g. for 3D personalization of ID cards, driving licenses, passport pages, etc.) The last mentioned combination can be interesting for development of new visual effects. Another big field of application is in printed electronics. For quality printed diodes, transistors and circuits the common requirement is the sub-10 micron resolution. Planographic printing is more convenient for laboratory tests while rotogravure is suitable for mass production.

The invention claimed is:

1. A method of making a product with a functional relief surface with high resolution up to 10 nm, which is copied from a master comprising a template or carrier of a negative relief of the relief surface, wherein the template of the relief surface is provided with at least one layer of geopolymer composite, applied in a precursor state in the form of a liquid dispersion or grout in plastic or thixotropic condition, whose thickness is the same or greater than the depth of the template relief, at temperatures in a range from a temperature corresponding to the cryoscopic properties of the precursor to a temperature corresponding to thermal decomposition of the precursor, and after hardening of the geopolymer composite the layer or layers is/are separated from the template.

2. The method according to claim 1, wherein the application of layers of geopolymer composite in a precursor state is performed by casting, dip coating, spin coating and spraying or rolling of layers of a non-sagging grout, while minimizing formation of air bubbles.

3. The method according to claim 2, wherein the layer of geopolymer composite is during its formation exposed to vibrations, pressure or vacuum to achieve its proper contact with the template surface.

4. The method according to claim 1, wherein the formation of a layer or layers from geopolymer composite is performed at working temperatures from 5 to 50° C.

5. The method according to claim 4, wherein the formation of a layer or layers from geopolymer composite is performed at working temperatures from 20 to 25° C.

6. The method according to claim 1, wherein the dynamic viscosity of the initial dispersion for the formation of a layer or layers from geopolymer composite is in the interval from 1000 to 50000 mPas or is a non-sagging grout.

7. The method according to claim 1, wherein in order to increase the strength of the product while its fine structure on the surface is maintained, the product is structured in layers in a cross section perpendicular to the relief surface, by means of anisotropic fillers with grains of various shapes and sizes and by isotropic fillers and macromolecular substances, or by reinforcement with fibers and textiles made of mineral and glass melts, carbon, plastics and metal wires, while the functional part of the geopolymer composite layer, adjoining on the relief surface, has grains of smaller or the same size as the minimum dimension of the relief, while other layers of the product contain bigger particles of solid substances.

8. The method according to claim 1, wherein the binding geopolymer material in the geopolymer composite contains on average $SiO_2$ from 20 to 95% wt., $Al_2O_3$ from 5 to 80% wt. and other substances recalculated to oxides, such as $Fe_2O_3$ from 0 to 79% wt., $CaO$ from 0 to 79% wt., $Na_2O$ from 0 to 35% wt. and $K_2O$ from 0 to 35% wt., $Li_2O$ from 0 to 35% wt., $TiO_2$ from 0 to 79% wt.

9. The method according to claim 8, wherein the binding geopolymer material in the geopolymer composite contains on average $SiO_2$ from 46 to 80% wt., $Al_2O_3$ from 5 to 40% wt., $Fe_2O_3$ from 2 to 70% wt., $CaO$ from 0 to 50% wt., $Na_2O$ from 0 to 35% wt. and $K_2O$ from 0 to 35% wt.

10. The method according to claim 1, wherein after the entire composite is removed or separated from the template the product is maintained at a constant humidity for a period from several hours to days.

11. The method according to claim 1, wherein the functional relief surface is a surface selected form a group including optically active surfaces, mechanical, hydromechanical, aerodynamic, adsorption or selective functional surfaces or data relief surfaces, while the functional optically active relief surface is selected from a group including optical diffractive relief surfaces, reflexive relief surfaces, refractive relief surfaces, electronic relief surface and data carrying surfaces.

12. The method according to claim 8, wherein the specific surfaces of the filler and other added solid substances are greater than $6\times10^{-2}$ $m^2/g$, the geopolymer binder is the sole binder used, and the minimum content of the geopolymer binder is 10% wt.

13. The method according to claim 9, wherein the specific surfaces of the filler and other added solid substances are greater than $6\times10^{-2}$ $m^2/g$, the geopolymer binder is the sole binder used, and the minimum content of the geopolymer binder is 10% wt.

* * * * *